United States Patent
Lee et al.

(10) Patent No.: US 12,476,308 B2
(45) Date of Patent: Nov. 18, 2025

(54) BATTERY CASE FOR SECONDARY BATTERY AND POUCH TYPE SECONDARY BATTERY

(71) Applicant: LG Energy Solution, Ltd., Seoul (KR)

(72) Inventors: Sang Kyun Lee, Daejeon (KR); Min Soo Park, Daejeon (KR); Young Ha Kim, Daejeon (KR); Young Hoon Hong, Daejeon (KR); Eui Jin Hong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 691 days.

(21) Appl. No.: 17/434,584

(22) PCT Filed: Mar. 18, 2020

(86) PCT No.: PCT/KR2020/003699
§ 371 (c)(1),
(2) Date: Aug. 27, 2021

(87) PCT Pub. No.: WO2020/204407
PCT Pub. Date: Oct. 8, 2020

(65) Prior Publication Data
US 2022/0140425 A1    May 5, 2022

(30) Foreign Application Priority Data
Mar. 29, 2019   (KR) .................. 10-2019-0037075

(51) Int. Cl.
*H01M 50/105*  (2021.01)
*H01M 50/186*  (2021.01)

(52) U.S. Cl.
CPC ....... *H01M 50/105* (2021.01); *H01M 50/186* (2021.01)

(58) Field of Classification Search
CPC .................... H01M 50/105; H01M 50/186
See application file for complete search history.

(56) References Cited

U.S. PATENT DOCUMENTS

2009/0297930 A1 * 12/2009 Koishikawa ......... H01M 50/119
429/94
2009/0311592 A1    12/2009 You et al.
(Continued)

FOREIGN PATENT DOCUMENTS

CN      107851741 A    3/2018
JP       4952658 B2    6/2012
(Continued)

OTHER PUBLICATIONS

English Machine Translation for KR 20150009347A (Year: 2015).*
(Continued)

*Primary Examiner* — Matthew T Martin
*Assistant Examiner* — Katherine N Higgins
(74) *Attorney, Agent, or Firm* — Lerner David LLP (57) ABSTRACT

To achieve the above objects, a battery case for a secondary battery, the battery case being a pouch type battery case that is configured to accommodate an electrode assembly therein, the electrode assembly including stacked electrodes and separators therein, the battery case according to an embodiment of the present invention including a first cup part and a second cup part, each formed as a respective recess extending downward from a top surface of a pouch film; a bridge formed between the first cup part and the second cup part and having a constant width and height; and two complement parts disposed outside of respective first and second longitudinal ends of the bridge, each of the complement parts protruding upward from the top surface of the pouch film.

14 Claims, 12 Drawing Sheets

(56) References Cited

U.S. PATENT DOCUMENTS

| | | | |
|---|---|---|---|
| 2013/0084484 A1 | 4/2013 | Shinyashiki et al. | |
| 2013/0323563 A1 | 12/2013 | Eo | |
| 2014/0255757 A1 | 9/2014 | Kang et al. | |
| 2015/0295209 A1 | 10/2015 | Koishikawa | |
| 2016/0093837 A1 | 3/2016 | Bushnell et al. | |
| 2016/0380245 A1 | 12/2016 | Kang | |
| 2017/0025648 A1* | 1/2017 | Yu | H01M 10/0431 |
| 2017/0025723 A1 | 1/2017 | Isozaki et al. | |
| 2018/0219245 A1* | 8/2018 | Choi | H01M 10/045 |
| 2019/0027714 A1 | 1/2019 | Jung et al. | |
| 2019/0044099 A1 | 2/2019 | Kang | |
| 2019/0386330 A1 | 12/2019 | Choi et al. | |
| 2019/0393455 A1 | 12/2019 | Seo et al. | |
| 2020/0067029 A1 | 2/2020 | Park et al. | |
| 2020/0403191 A1 | 12/2020 | Kang | |
| 2021/0066676 A1 | 3/2021 | Jung et al. | |
| 2022/0115687 A1 | 4/2022 | Choi et al. | |

FOREIGN PATENT DOCUMENTS

| | | | | |
|---|---|---|---|---|
| JP | 6224225 B2 | | 11/2017 | |
| JP | 2018527719 A | | 9/2018 | |
| KR | 100869377 B1 | | 11/2008 | |
| KR | 100895202 B1 | | 5/2009 | |
| KR | 100910624 B1 | | 8/2009 | |
| KR | 20130133585 A | | 12/2013 | |
| KR | 20140110793 A | | 9/2014 | |
| KR | 101446149 B1 | | 10/2014 | |
| KR | 2014137603 A | * | 12/2014 | |
| KR | 101485180 B1 | | 1/2015 | |
| KR | 20150009347 A | * | 1/2015 | |
| KR | 20160032889 A | | 3/2016 | |
| KR | 20170002013 A | | 1/2017 | |
| KR | 20170022156 A | | 3/2017 | |
| KR | 20170058021 A | | 5/2017 | |
| KR | 101779156 B1 | | 9/2017 | |
| KR | 101818806 B1 | | 1/2018 | |
| KR | 20180029856 A | | 3/2018 | |
| KR | 20180085185 A | | 7/2018 | |
| KR | 20180123901 A | | 11/2018 | |
| KR | 101927262 B1 | | 12/2018 | |
| KR | 20190024755 A | * | 3/2019 | |
| WO | WO-2011159106 A2 | * | 12/2011 | H01M 10/0436 |
| WO | 2019045329 A1 | | 3/2019 | |

OTHER PUBLICATIONS

English Machine Translation for KR 20190024755A (Year: 2019).*
English Machine Translation for KR-20140137603-A (Year: 2014).*
English Machine Translation for WO-2011159106-A2 (Year: 2011).*
International Search Report for Application No. PCT/KR2020/0036999 mailing Jun. 29, 2020, 2 pages.
Search Report dated Nov. 7, 2022 from the Office Action for Chinese Application No. 202080014724.5 issued Nov. 15, 2022, pp. 1-3.

* cited by examiner

BATTERY CASE FOR SECONDARY BATTERY AND POUCH TYPE SECONDARY BATTERY

CROSS-REFERENCE TO RELATED APPLICATIONS

This application is a national phase entry under 35 U.S.C. § 371 of International Application No. PCT/KR2020/003699, filed on Mar. 18, 2020, published in Korean, which claims priority to Korean Patent Application No. 10-2019-0037075, filed on Mar. 29, 2019, the contents of which are hereby incorporated herein by reference in their entireties.

TECHNICAL FIELD

The present invention relates to a battery case for a secondary battery and a pouch type secondary battery, and more particularly, a battery case for a secondary battery, in which an error in size is reduced, and energy density to a volume increases, and a pouch type secondary battery.

BACKGROUND ART

In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

In order to manufacture an electrode assembly, a cathode, a separator, and an anode are manufactured and stacked. Specifically, cathode active material slurry is applied to a cathode collector, and anode active material slurry is applied to an anode collector to manufacture a cathode and an anode. Also, when the separator is interposed and stacked between the manufactured cathode and anode, unit cells are formed. The unit cells are stacked on each other to form an electrode assembly. Also, when the electrode assembly is accommodated in a specific case, and an electrolyte is injected, the secondary battery is manufactured.

Such a secondary battery is classified into a pouch type secondary battery and a can type secondary battery according to a material of a battery case accommodating an electrode assembly. In the pouch type secondary battery, the electrode assembly is accommodated in a pouch made of a flexible polymer material having a variable shape. Also, in the can type secondary battery, an electrode assembly is accommodated in a case made of a metal or plastic material having a predetermined shape.

The pouch type battery case is manufactured by performing drawing molding on a pouch film having flexibility to form a cup part. The drawing molding is performed by inserting a pouch film into a press and applying a pressure to the pouch film through a punch to stretch the pouch film. In addition, when the cup part is formed, an electrode assembly is accommodated in an accommodation space of the cup part, and then, the battery case is folded to seal a sealing part, thereby manufacturing a secondary battery.

When the cup part is molded in the pouch film, two cup parts that are symmetrical to each other may be drawn and molded to be adjacent to each other in one pouch film. Also, the electrode assembly may be accommodated in the accommodation space of the one cup part, and then, the battery case may be folded so that the two cup parts face each other. As a result, since the two cup parts accommodate the one electrode assembly, the electrode assembly having a thickness thicker than of an electrode assembly accommodated in one cup part. Also, since the battery case is folded to form one edge of the secondary battery, only three edges except for the one edge may be sealed when a sealing process is performed later. Thus, the number of edges to be sealed may be reduced to improve a process rate and reduce the number of trimming processes.

Figure 1:
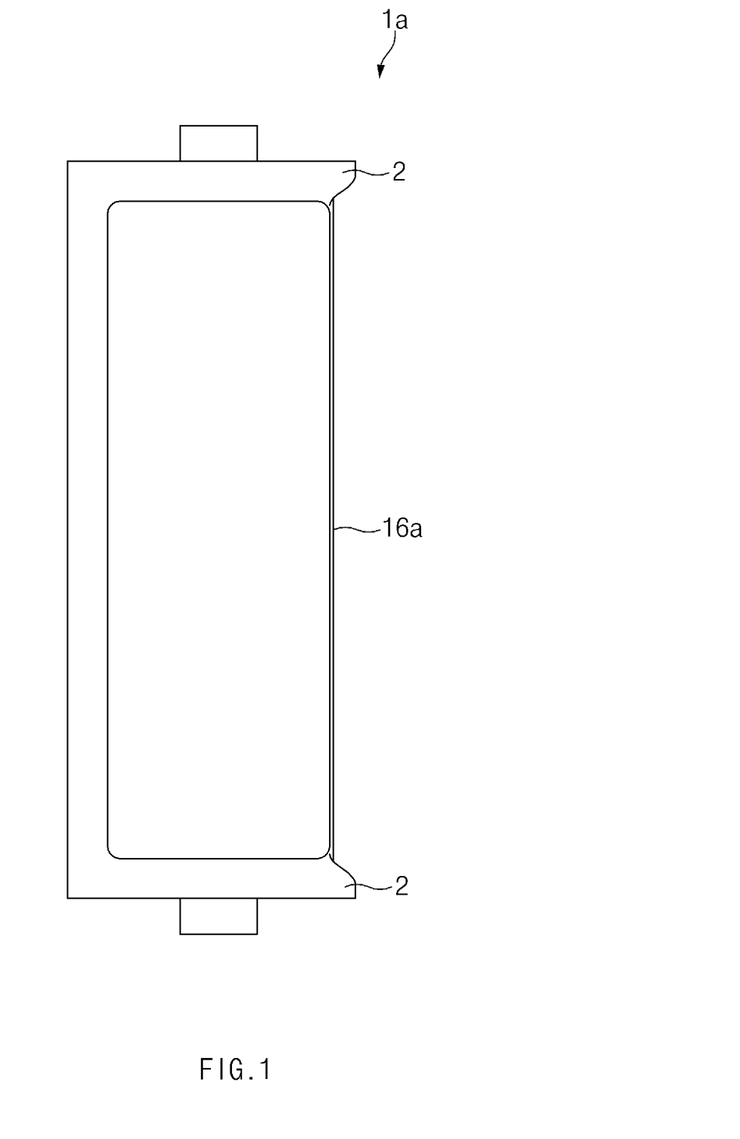
FIG. 1 is a plan view of a pouch type secondary battery according to a related art.

FIG. 1 is a plan view of a pouch type secondary battery 1a according to the related art.

When a battery case is folded, and heat and a pressure are applied to seal the battery case, a portion of folded one edge 16a of the secondary battery 1a protrudes to the outside. This is called a bat ear 2.

As illustrated in FIG. 1, when the bat ear 2 protrudes, an unnecessary volume further increases, and thus an error occurs in a designed size of the secondary battery 1a. Thus, when assembling the secondary batteries 1a to manufacture a battery module or the like, there is a problem in that it is not easy to assembly the secondary batteries 1a, and each of the secondary batteries 1a has to be designed with a small size from the beginning. Also, since the volume of the secondary battery 1a increases as a whole, there is also a problem in that energy density to the volume decreases.

DISCLOSURE OF THE INVENTION

Technical Problem

An object to be achieved by the present invention is to provide a battery case for a secondary battery, which is capable of reducing an error in size and increasing in energy density to a volume, and a pouch type secondary battery.

The objects of the present invention are not limited to the aforementioned object, but other objects not described herein will be clearly understood by those skilled in the art from descriptions below.

Technical Solution

To achieve the above objects, a battery case for a secondary battery, which is provided as a pouch type battery case that accommodates an electrode assembly, in which electrodes and separators are stacked, therein, according to an embodiment of the present invention includes: a first cup part and a second cup part, each of which is formed to be recessed in a pouch film; a bridge formed between the first cup part and the second cup part and having a constant width and height; and a complement part disposed outside each of both ends of the bridge in a longitudinal direction to protrude upward.

Also, a central axis formed in the longitudinal direction of the bridge may pass through the complement part.

Also, the complement part may have the same width as the bridge.

Also, the complement part may be disposed at one side of the first cup part, and one edge of the complement part may be parallel to a central axis formed in the longitudinal direction of the bridge.

Also, the complement part may have the same height as the bridge.

Also, the one edge of the complement part may be disposed in the same straight line as one edge of the bridge in the longitudinal direction.

Also, the complement part may have a polyhedral shape.

Also, the complement part may have a hexahedral shape.

Also, the complement part may include polypropylene (PP).

Also, the first cup part and the second cup part may be symmetrical to each other.

Also, a symmetrical axis of the first cup part and the second cup part may be the same as a central axis of the bridge.

A pouch type secondary battery for achieving the above objects includes: an electrode assembly in which electrodes and separators are alternately stacked; and a battery case accommodating the electrode assembly therein, wherein the battery case includes: a first cup part and a second cup part, which face each other to accommodate the electrode assembly therein; a folding part which integrally connects the first cup part to the second cup part and is folded so that the first cup part and the second cup part face each other; sealing parts formed around the first cup part and the second cup part so as to be sealed in contact with each other; and a complement part disposed outside each of the first cup part and the second cup part and adjacent to the folding part so as to be sealed together with the sealing part.

Also, the complement part may have a polyhedral shape.

Also, the complement part may have a hexahedral shape.

Particularities of other embodiments are included in the detailed description and drawings.

Advantageous Effects

The embodiments of the present invention may have at least the following effects.

The formation of the bat ear may be prevented to reduce the error occurring in the designed size of the secondary battery, and the secondary batteries may be easily assembled to manufacture the battery module.

In addition, since the unnecessary volume of the secondary battery decreases as a whole, the energy density to the volume may increase.

The effects of the prevent invention are not limited by the aforementioned description, and thus, more varied effects are involved in this specification.

MODE FOR CARRYING OUT THE INVENTION

Advantages and features of the present invention, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may include plural forms unless specifically mentioned. The meaning of "comprises" and/or "including" does not exclude other components besides a mentioned component.

Hereinafter, preferred embodiments will be described in detail with reference to the accompanying drawings.

Figure 2:
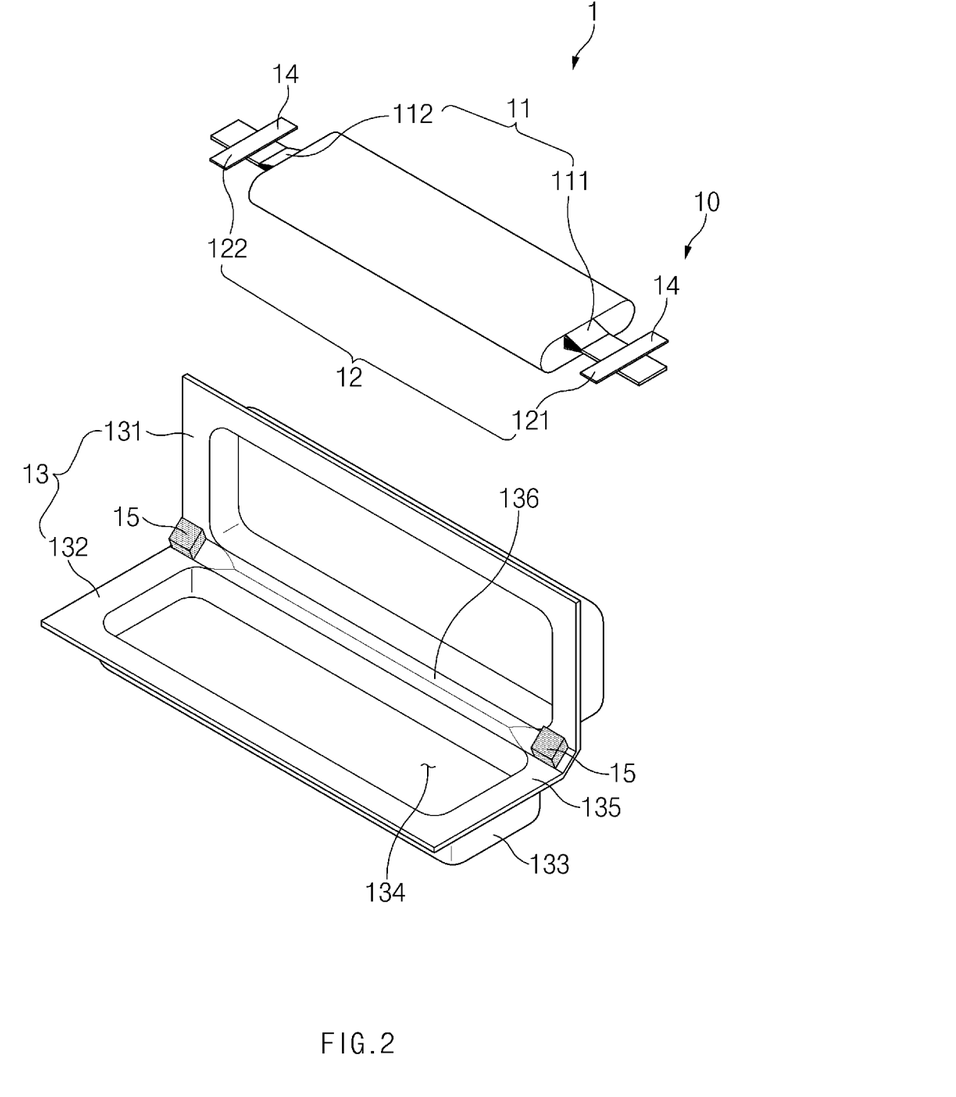
FIG. 2 is an assembly view of a pouch type secondary battery according to an embodiment of the present invention.
Figure 3:
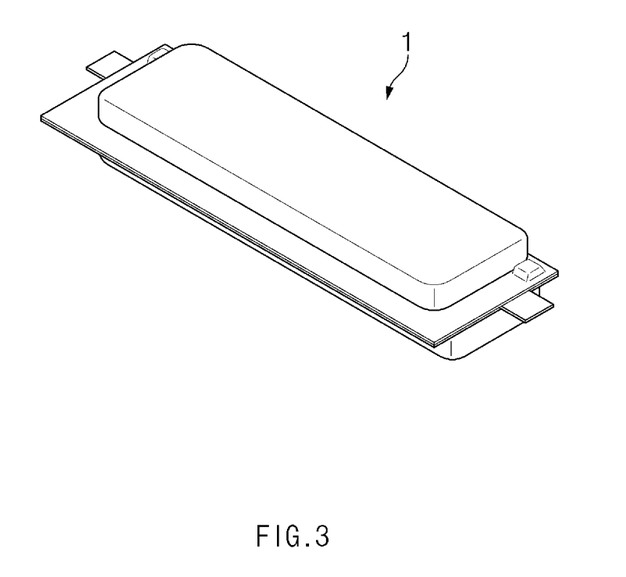
FIG. 3 is a perspective view of the pouch type secondary battery according to an embodiment of the present invention.

FIG. 2 is an assembly view of a pouch type secondary battery 1 according to an embodiment of the present invention, and FIG. 3 is a perspective view of the pouch type secondary battery 1 according to an embodiment of the present invention.

As illustrated in FIG. 2, the pouch type secondary battery 1 according to an embodiment of the present invention includes a pouch type battery case 13 and an electrode assembly 10 accommodated in the battery case 13.

The electrode assembly 10 may be a stacked structure including two electrodes such as a positive electrode and a negative electrode and a separator interposed between the electrodes to insulate the electrodes from each other or disposed at a left or right side of one electrode. The stacked structure may have various shapes without being limited in shape. For example, the positive electrode and the negative electrode, each of which has a predetermined standard, may be stacked with the separator therebetween, or the stacked structure may be wound in the form of a jelly roll. Each of the two electrodes has a structure in which active material slurry is applied to a metal foil or a mesh-shaped collector including aluminum and copper. The slurry may be usually formed by agitating a granular active material, an auxiliary conductor, a binder, and a plasticizer with a solvent added. The solvent may be removed in the subsequent process.

As illustrated in FIG. 2, the electrode assembly 10 includes the electrode tabs 11. The electrode tabs 11 are respectively connected to a positive electrode and a negative electrode of the electrode assembly 10 to protrude to the outside of the electrode assembly 10, thereby providing a path, through which electrons are moved, between the inside and outside of the electrode assembly 10. A collector of the electrode assembly 10 is constituted by a portion coated with an electrode active material and a distal end, on which the electrode active material is not applied, i.e., a non-coating portion. Also, each of the electrode tabs 11 may be formed by cutting the non-coating portion or by connecting a separate conductive member to the non-coating portion through ultrasonic welding. As illustrated in FIG. 2, the electrode tabs 11 may protrude in each of different directions of the electrode assembly 10, but is not limited thereto. For example, the electrode tabs may protrude in parallel to each other from one side in the same direction.

In the electrode assembly 10, the electrode lead 12 is connected to the electrode tab 11 through spot welding. Also, a portion of the electrode lead 12 is surrounded by an insulation part 14. An insulation part 14 may be disposed to be limited within a sealing part 135, at which an upper case 131 and a lower case 132 are thermally fused, so as to be bonded to the battery case 13. Also, electricity generated from the electrode assembly 10 may be prevented from flowing to the battery case 13 through the electrode lead 12, and the sealing of the battery case 13 may be maintained. Thus, the insulation part 14 may be made of a nonconductor having non-conductivity, which is not electrically conductive. In general, although an insulation tape which is easily attached to the electrode lead 12 and has a relatively thin thickness is mainly used as the insulation part 14, the present invention is not limited thereto. For example, various members may be used as the insulation part 14 as long as the members are capable of insulating the electrode lead 12.

The electrode lead 12 may extend in different directions or extend in the same direction according to the formation positions of the positive electrode tab 111 and the negative electrode tab 112. The positive electrode lead 121 and the negative electrode lead 122 may be made of materials different from each other. That is, the positive electrode lead 121 may be made of the same material as the positive electrode plate, i.e., an aluminum (Al) material, and the negative electrode lead 122 may be made of the same material as the negative electrode plate, i.e., a copper (Cu) material or a copper material coated with nickel (Ni). Also, a portion of the electrode lead 12, which protrudes to the outside of the battery case 13, may be provided as a terminal part and electrically connected to an external terminal.

The battery case 13 is a pouch made of a flexible material and is manufactured by performing drawing molding on the pouch film having flexibility to form a cup part 133. Also, the battery case 13 accommodates the electrode assembly 10 so that a portion of the electrode lead 12, i.e., the terminal part is exposed and then is sealed. As illustrated in FIG. 2, the battery case 13 includes the upper case 131 and the lower case 132. One cup part 133 may be formed in each of the upper case 131 and the lower case 132 to provide an accommodation space 134 in which the electrode assembly 10 is accommodated. Also, the upper case 131 covers the accommodation space 134 from an upper side to prevent the electrode assembly 10 from being separated from the battery case 13.

A bridge 136 is a portion that is not molded between the two cup parts 133 when drawing and molding the two cup parts 133 so as to be adjacent to each other in the pouch film. Thus, the bridge 136 is formed between the two cup parts 133 and has a constant width D (see FIG. 4) and a constant height H (see FIG. 6). When the upper case 131 covers the lower case 132 from the upper side, the battery case 13 is folded. Here, since the bridge 136 formed between the two cup parts 133 is folded with respect to a central axis C formed in a longitudinal direction, the battery case 13 is folded. Detailed description of the bridge 136 will be described later.

A complement part 15 is disposed outside each of both ends in the longitudinal direction of the bridge 136 to protrude upward. In addition, when the battery case 13 is sealed later, the complement part 15 is sealed together with the sealing part 135 to prevent the bat ear 2 from being formed. The detailed description of the complement part 135 will be described later.

When an electrode lead 12 is connected to the electrode tab 11 of the electrode assembly 10, and the insulation part 14 is provided on a portion of the electrode lead 12, the electrode assembly 10 may be accommodated in the accommodation space 134 provided in the cup part 133 of the lower case 132, and the upper case 131 may cover the accommodation space from the upper side. Also, the electrolyte is injected, and the sealing part 135 formed on edges of the upper case 131 and the lower case 132 is sealed. The electrolyte may move lithium ions generated by electrochemical reaction of the electrode during charging and discharging of the secondary battery 1. The electrolyte may include a non-aqueous organic electrolyte that is a mixture of a lithium salt and a high-purity organic solvent or a polymer using a polymer electrolyte. As illustrated in FIG. 3, the pouch type secondary battery 1 may be manufactured through the above-described method.

Figure 4:
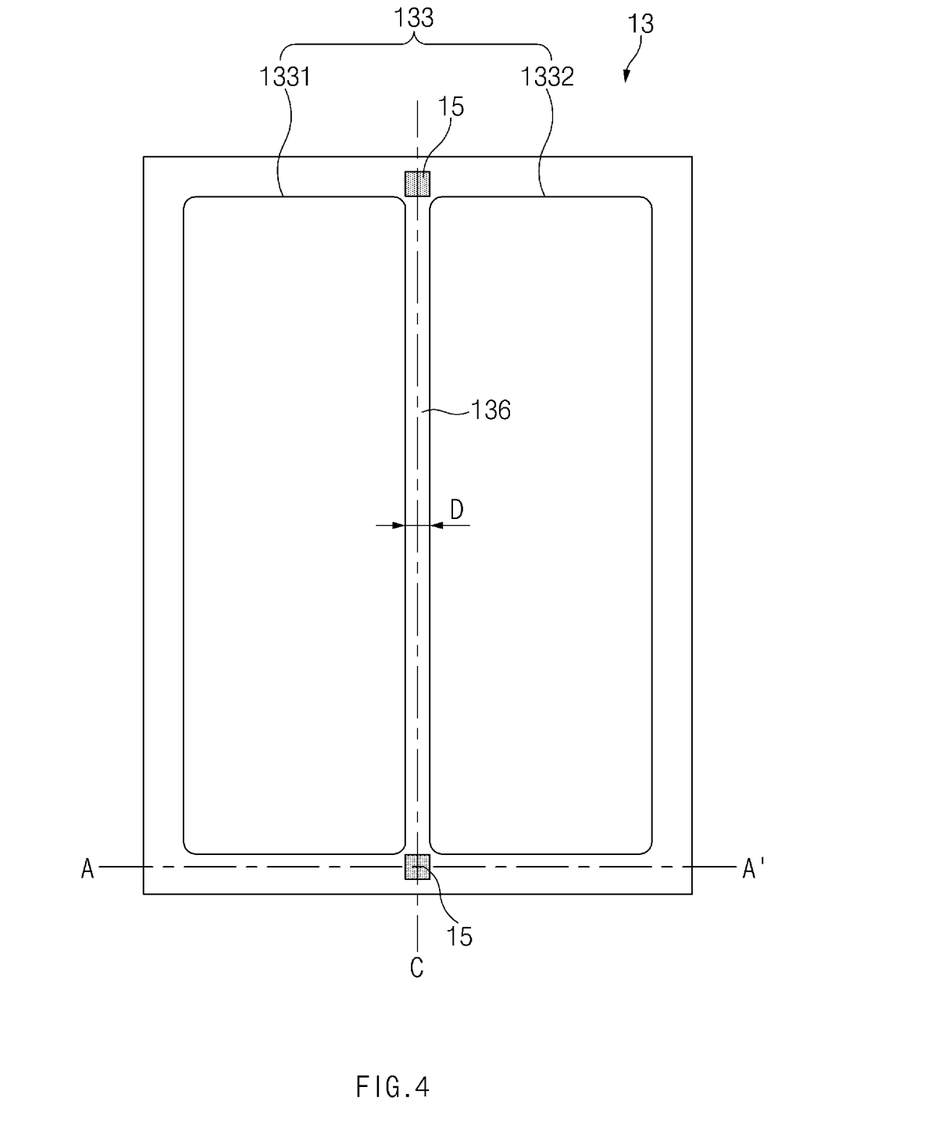
FIG. 4 is a plan view of a battery case according to an embodiment of the present invention.

FIG. 4 is a plan view of the battery case 13 according to an embodiment of the present invention.

According to an embodiment of the present invention, the formation of the bat ear 2 may be prevented to reduce an error that occurs in a designed size of the secondary battery 1, and thus, the secondary batteries 1 may be easily assembled to form a battery module. Also, since the secondary battery 1 is reduced in volume as a whole, energy density to the volume may increase.

In the battery case for the secondary battery according to an embodiment of the present invention, the battery case for the secondary battery, which accommodates an electrode assembly 10, in which electrodes and separators are stacked, includes: a first cup part 1331 and a second cup part 1332, each of which is formed to be recessed in the pouch film; a bridge 136 formed between the first cup part 1331 and the second cup part 1332 and having constant width D and height H; and a complement part 15 disposed outside each of both ends in the longitudinal direction of the bridge 136 to protrude upward.

The battery case 13 according to an embodiment of the present invention is formed by drawing and molding the first cup part 1331 and the second cup part 1332, which are symmetrical to each other, so as to be adjacent to each other in one pouch film. Here, the first cup part 1331 may be formed in the upper case 131, and the second cup part 1332 may be formed in the lower case 132. Alternatively, the first cup part 1331 may be formed in the lower case 132, and the second cup part 1332 may be formed in the upper case 131.

As illustrated in FIG. 4, the first cup part 1331 and the second cup part 1332 are formed symmetrically to each other, and the bridge 136 having the constant width D and height H is formed between the first cup part 1331 and the second cup part 1332. Also, a symmetrical axis of the first cup part 1331 and the second cup part 1332 may be the same as the central axis C formed in the longitudinal direction of the bridge 136. The bridge 136 is a portion that is not molded between the first cup part 1331 and the second cup part 1332 when drawing and molding the two cup parts 133 so as to be adjacent to each other in the pouch film. In general, when molding the pouch film, the drawing molding is performed by placing the pouch film on a die, allowing a stripper to fix the pouch film, and stretching the pouch film by using a punch. Here, when molding the first cup part 1331 and the second cup part 1332, a partition wall that partitions the molding space of the die into two spaces exists. Thus, the width D of the bridge 136 between the first cup part 1331 and the second cup part 1332 may be determined by a thickness of the partition wall.

The electrode assembly 10 is accommodated in the accommodation space 134 of the cup part 133, and the battery case 13 is molded so that the upper case 131 covers the lower case 132 from the upper side. Here, since the bridge 136 formed between the first cup part 1331 and the second cup part 1332 is folded with respect to the central axis C formed in the longitudinal direction, the battery case 13 is folded. When the bridge 136 is folded, the first cup part 1331 and the second cup part 1332 are folded to face each other, thereby forming a folding part 16. Thereafter, when the sealing is completed to manufacture the secondary battery 1, an outer edge of the folding part 16 becomes one edge of the secondary battery 1. The width D of the bridge 136 and a width of the folding part 16 are proportional to each other. However, since the more the width of the folding part 16 decreases, the more the energy density to the volume of the secondary battery 1 increases, it is preferable that the width D of the bridge 136 decreases.

When the battery case 13 is sealed later, the complement part 15 is inserted into both surfaces of the sealing part 135 and then is sealed together. Since the complement part 15 has a certain volume and shape, when the complement part 15 is sealed between both the surfaces of the sealing part 135, the sealing part 135 protrudes upward and downward to prevent the bat ear 2 from being formed.

The complement part 15 may be disposed outside each of both ends of the bridge 136 in the longitudinal direction and protrude upward. Particularly, the complement part 15 may be disposed after being manufactured separately from the battery case 13. The complement part 15 may be simply seated outside both the ends of the bridge 136 in the longitudinal direction, but may adhere to outside both the ends by using an adhesive or the like.

As illustrated in FIG. 4, according to an embodiment of the present invention, the central axis C formed in the longitudinal direction of the bridge 136 may pass through the complement part 15. Particularly, the central axis C of the bridge 136 may bisect a bottom surface of the complement part 15.

Figure 5:
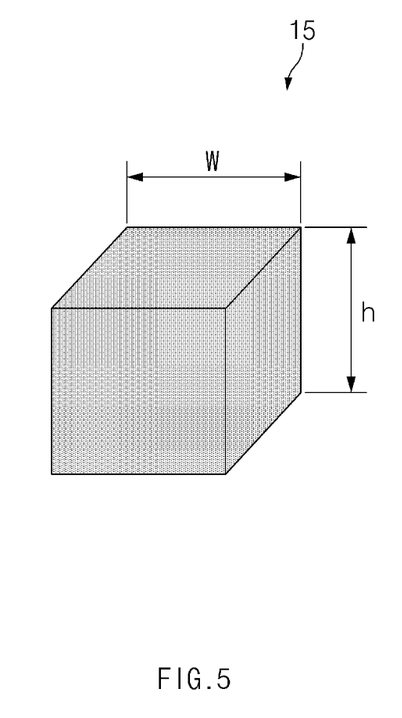
FIG. 5 is a perspective view of a complement part according to an embodiment of the present invention.

FIG. 5 is a perspective view of the complement part 15 according to an embodiment of the present invention.

The complement part 15 has a constant volume and shape and preferably has a polyhedral shape. Particularly, as illustrated in FIG. 5, the complement part 15 is more preferably having a hexahedral shape. However, the present invention is not limited thereto and may have various shapes such as a hemispherical shape and an elliptical hemispherical shape.

Since the complement part 15 is sealed together with the sealing part 135, it is preferable to be made of the same material as a sealant layer, which is the innermost layer of the pouch film. For example, if the sealant layer of the pouch film is made of polypropylene (PP), it is preferable that the complement part 15 is also made of polypropylene (PP). As a result, when the sealing part 135 is sealed, fusion between the sealing part 135 and the complement part 15 may increase.

Figure 6:
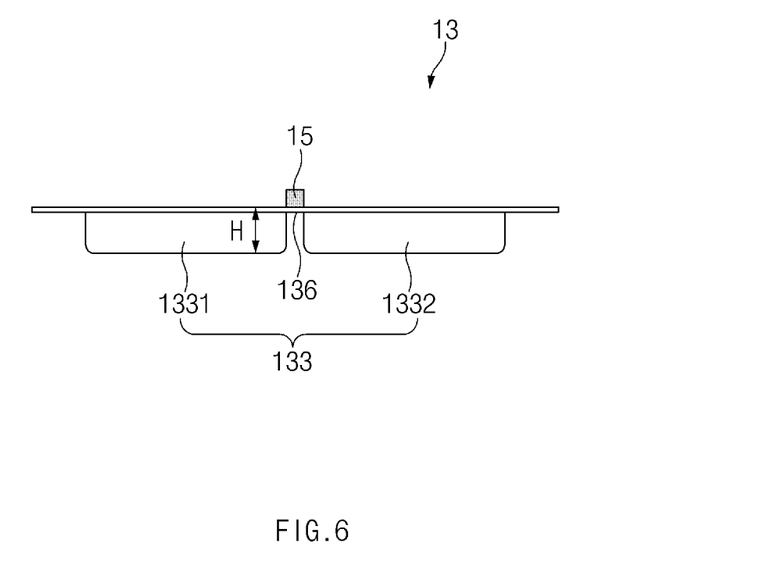
FIG. 6 is a cross-sectional view of a battery case, taken along line A-A' of FIG. 4, according to an embodiment of the present invention.
Figure 7:
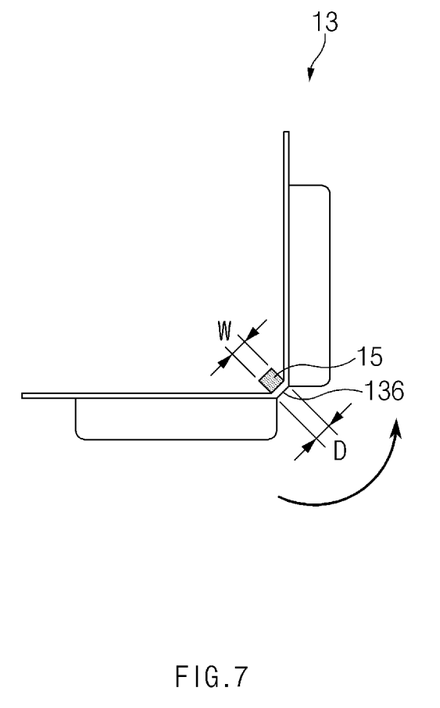
FIG. 7 is a cross-sectional view illustrating a state in which the battery case is folded, taken along line A-A' of FIG. 4, according to an embodiment of the present invention.

FIG. 6 is a cross-sectional view of the battery case 13, taken along line A-A' of FIG. 4, according to an embodiment of the present invention, and FIG. 7 is a cross-sectional view illustrating a state in which the battery case 13 is folded, taken along line A-A' of FIG. 4, according to an embodiment of the present invention.

The complement part 15 is disposed outside each of both the ends of the bridge 136 in the longitudinal direction. Particularly, as illustrated in FIG. 6, according to an embodiment of the present invention, the central axis C formed in the longitudinal direction of the bridge 136 passes through complement part 15. Also, since the bridge 136 is folded with respect to the central axis C formed in the longitudinal direction, the battery case 13 is folded. Here, since the central axis C of the bridge 136 passes through the complement part 15, an area on which the complement part 15 is disposed is folded with respect to both the edges of the complement part 15 as illustrated in FIG. 7. Also, as the bridge 136 is folded, the complement part 15 rotates along a folding direction of the bridge 136.

Then, when the sealing is completed later, a portion of the folding part 16 is used to surround a periphery of the complement part 15. However, if a width w of the complement part 15 is excessively less than the width D of the bridge 136, since a portion of the folding part 16 is a region remaining after surrounding the periphery of the complement part 15, the bat ears 2 may be formed. Thus, it is preferable that the width w of the complement part 15 is equal to or greater than the width D of the bridge 136.

Figure 8:
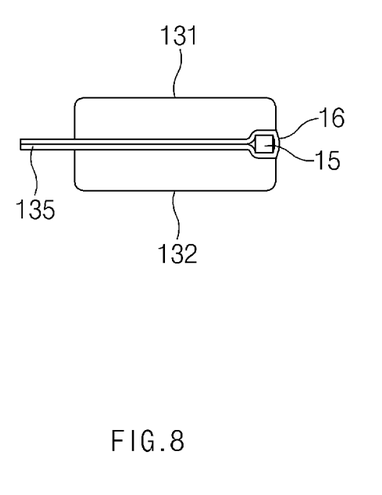
FIG. 8 is a cross-sectional view illustrating a state in which the folding of the battery case is completed, taken along line A-A' of FIG. 4, according to an embodiment of the present invention.

FIG. 8 is a cross-sectional view illustrating a state in which the folding of the battery case 13 is completed, taken along line A-A' of FIG. 4, according to an embodiment of the present invention.

When the folding of the battery case 13 is completed, the sealing part 135 of the battery case 13 is sealed. Then, as illustrated in FIG. 8, the complement part 15 is sealed together between both surfaces of the sealing part 135, and the sealing part 135 protrudes upward and downward.

According to the related art, when the battery case 13 is folded and then sealed by applying heat and a pressure to the sealing part 135 disposed outside both the ends of the bridge 136 in the longitudinal direction, a portion of the folding part 16 protrudes to the outside to form the bat ear 2. However, according to an embodiment of the present invention, a portion of the folding part 16, on which the bat ear 2 is would have formed in the related art, is used to surround the periphery of the complement part 15. Thus, the formation of the bat ear 2 may be prevented to reduce the error occurring in the designed size of the secondary battery 1, and the secondary batteries 1 may be easily assembled to manufacture the battery module. Also, since the volume of the secondary battery 1 is reduced as a whole by removing an unnecessary space, the energy density to the volume may increase.

Figure 9:
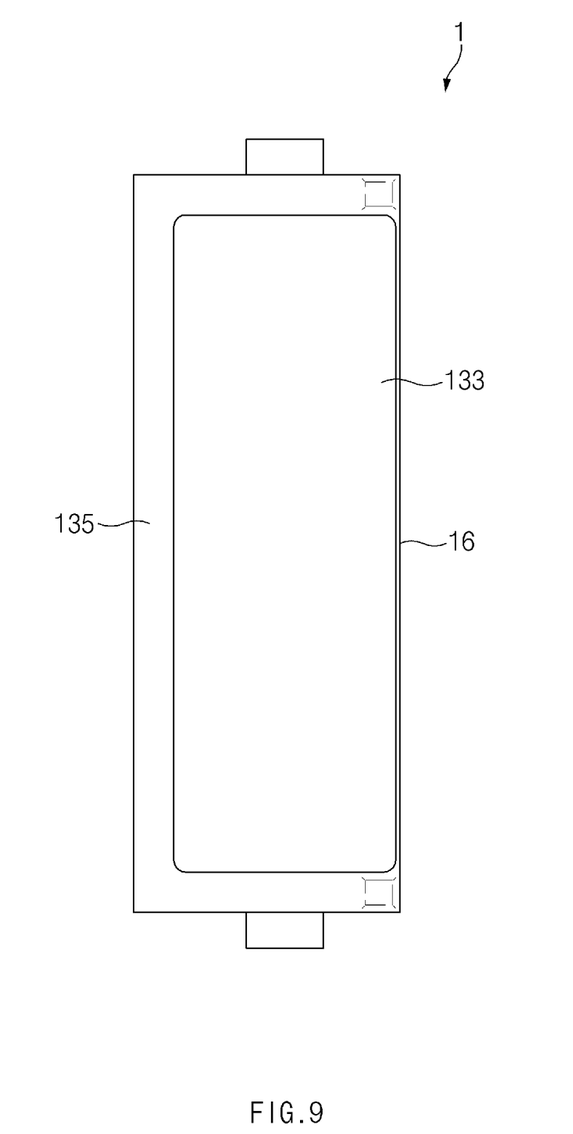
FIG. 9 is a plan view of a pouch type secondary battery according to an embodiment of the present invention.

FIG. 9 is a plan view of the pouch type secondary battery 1 according to an embodiment of the present invention.

The pouch type secondary battery 1 manufactured through the above-described method according to an embodiment of the present invention includes: an electrode assembly 10 formed by alternately stacking electrodes and separators; and a battery case 13 accommodating the electrode assembly 10 therein. The battery case 13 includes: a first cup part 1331 and a second a cup part 1332, which face each other to accommodate the electrode assembly 10 therein; a folding part 16 which is integrally connects the first cup part 1331 to the second cup part 1332 and is folded so that the first cup part 1331 and the second cup part 1332 face each other; sealing parts 135 formed around the first cup part 1331 and the second cup part 1332 and sealed in contact with each other; and a complement part 15 disposed outside each of the first cup part 1331 and the second cup part 1332 and adjacent to the folding part 16 so as to be sealed together with the sealing part 135.

Figure 10:
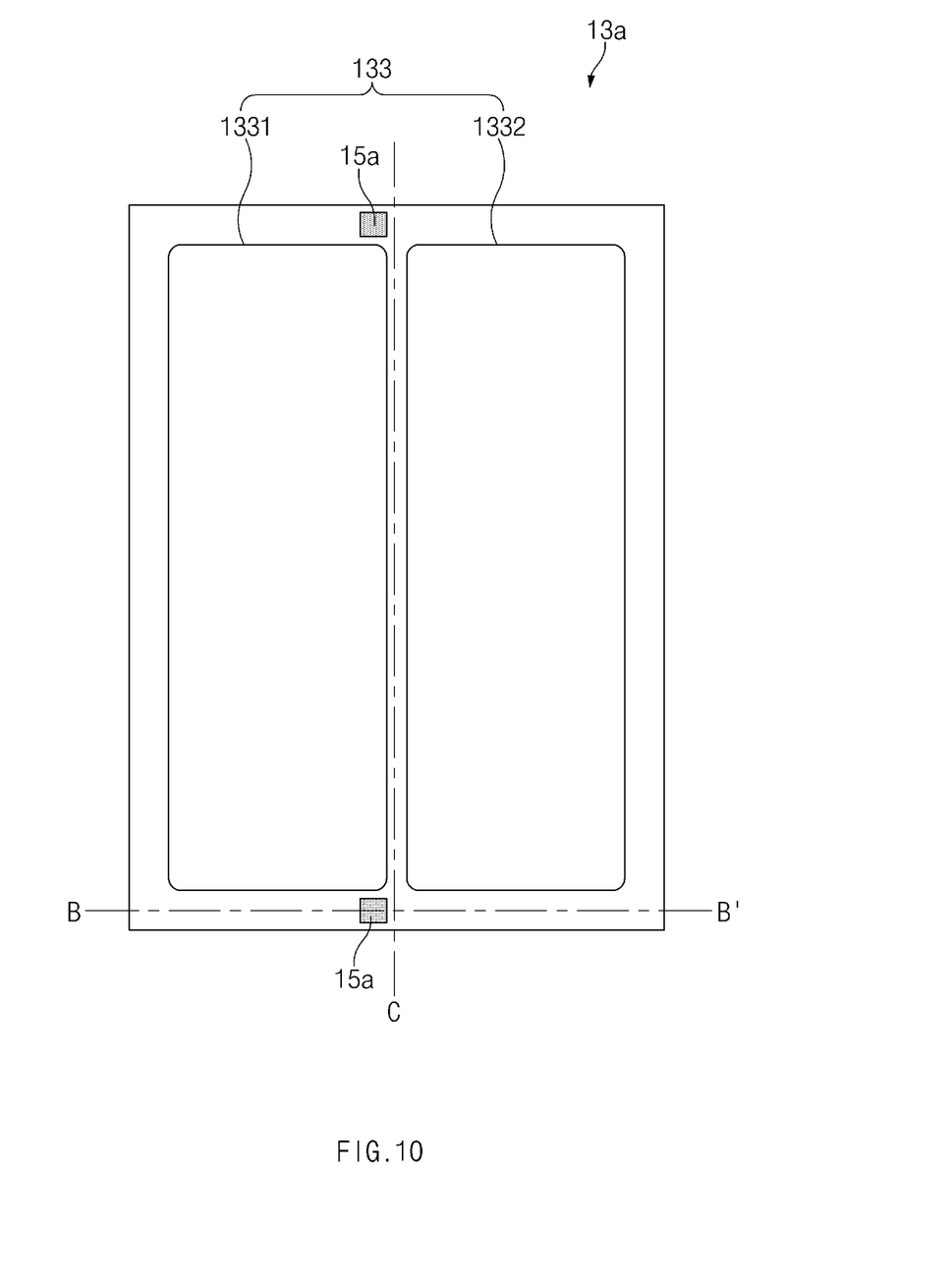
FIG. 10 is a plan view of a battery case according to another embodiment of the present invention.

FIG. 10 is a plan view of a battery case according to another embodiment of the present invention.

According to an embodiment of the present invention, the central axis C formed in the longitudinal direction of the bridge 136 passes through the complement part 15. As the bridge 136 is folded, the complement part 15 rotates along the folding direction of the bridge 136. Then, when the sealing is completed, since a portion of the folding part 16 is used to surround the periphery of the complement part 15, it is preferable that the width w of the complement part 15 is equal to or greater than the width D of the bridge 136.

On the other hand, according to another embodiment of the present invention, a complement part 15a is disposed outside each of both ends of a bridge 136 in a longitudinal direction. As illustrated in FIG. 10, the complement part 15a may be disposed at one side of a first cup part 1331, and one edge of the complement part 15a may be parallel to a central axis C formed in the longitudinal direction of the bridge 136. Particularly, it is preferable that the one edge of the complement part 15a is disposed in the same straight line as one edge of the bridge 136 in the longitudinal direction.

Figure 11:
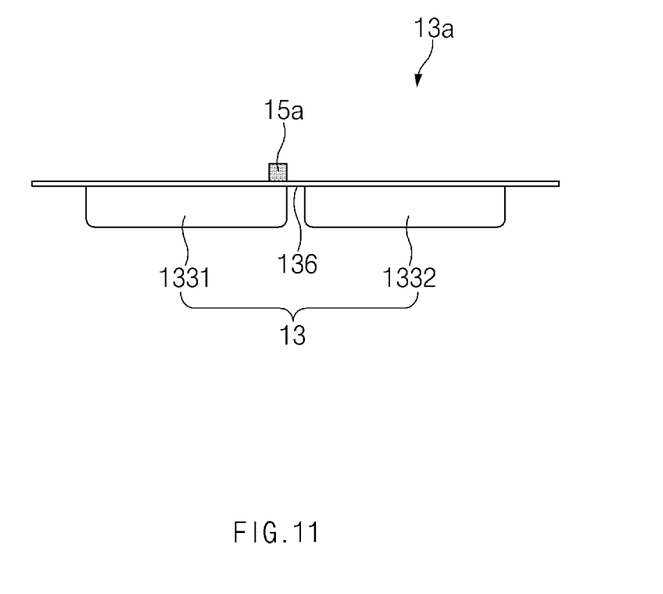
FIG. 11 is a cross-sectional view of the battery case, taken along line B-B' of FIG. 10, according to another embodiment of the present invention.
Figure 12:
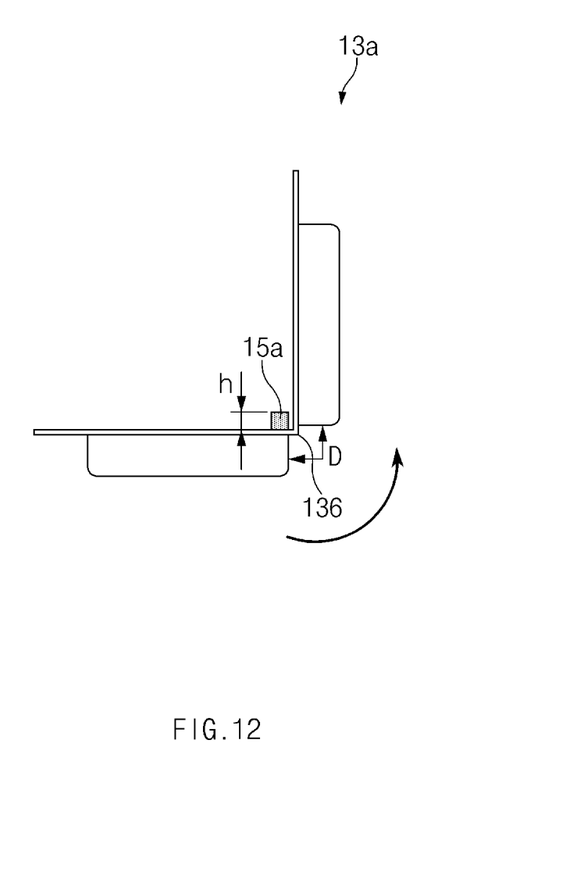
FIG. 12 is a cross-sectional view illustrating a state in which the battery case is folded, taken along line B-B' of FIG. 10, according to another embodiment of the present invention.

FIG. 11 is a cross-sectional view of the battery case 13a, taken along line B-B' of FIG. 10, according to another embodiment of the present invention, and FIG. 12 is a cross-sectional view illustrating a state in which the battery case 13a is folded, taken along line B-B' of FIG. 10, according to another embodiment of the present invention.

Since the bridge 136 is folded with respect to the central axis C formed in the longitudinal direction, the battery case 13a is folded. Here, since the complement part 15a is disposed at one side of a first cup part 1331, and one edge of the complement part 15a is parallel to the central axis C formed in the longitudinal direction of the bridge 136, an area of the battery case 13a, on which the complement part 15a is disposed, is not changed in position even though the bridge 136 is folded, as illustrated in FIG. 10.

Then, when the sealing is completed later, a portion of the folding part 16 is used to surround a periphery of the complement part 15a. However, if a height h of the complement part 15a is excessively less than a width D of the bridge 136, since a portion of a folding part 16 is a region remaining after surrounding a periphery of the complement part 15a, a bat ears 2 may be formed. Thus, it is preferable that the height h of the complement part 15a is equal to or greater than the width D of the bridge 136.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A battery case for a secondary battery, the battery case being a pouch type battery case that is configured to accommodate an electrode assembly therein, the electrode assembly including stacked electrodes and separators therein, the battery case comprising:
   a first cup part and a second cup part each formed as a respective recess extending downward from a top surface of a pouch film;
   a bridge formed between the first cup part and the second cup part and having a constant width and height; and
   two complement parts disposed outside of respective first and second longitudinal ends of the bridge, each of the complement parts protruding upward from the top surface of the pouch film,
   wherein each of the complement parts has a polyhedral shape of a constant solid volume,
   wherein each of the complement parts consists of a same material as a sealant layer that is an innermost layer of the pouch film, and
   wherein each of the complement parts is configured to protrude upward and downward relative to a plane of sealing parts of the pouch film that surround the complement parts.

2. The battery case of claim 1, wherein a central axis extending between the longitudinal ends of the bridge passes through each of the complement parts.

3. The battery case of claim 2, wherein each of the complement parts has a first width that is the same as a second width of the bridge.

4. The battery case of claim 1, wherein each of the complement parts is disposed at one side of the first cup part, and one edge of each of the complement parts is parallel to a central axis extending between the longitudinal ends of the bridge.

5. The battery case of claim 4, wherein each of the complement parts has a first height that is the same as a second height of the bridge.

6. The battery case of claim 4, wherein the one edge of each of the complement parts is disposed along a same straight line as one longitudinally-extending edge of the bridge.

7. The battery case of claim 1, wherein each of the complement parts has a hexahedral shape.

8. The battery case of claim 1, wherein each of the complement parts comprises polypropylene (PP).

9. The battery case of claim 1, wherein the first cup part and the second cup part are symmetrical with respect to each other about a symmetrical axis.

10. The battery case of claim 9, wherein the symmetrical axis is the same as a central axis extending between the longitudinal ends of the bridge.

11. A pouch type secondary battery comprising:
    an electrode assembly in which electrodes and separators are alternately stacked; and
    a battery case accommodating the electrode assembly therein,
    wherein the battery case comprises:
    a first cup part and a second cup part each facing each other and accommodating the electrode assembly therein;
    a folding part that integrally connects the first cup part to the second cup part and is folded so that the first cup part and the second cup part face each other;

sealing parts formed around the first cup part and the second cup part, the sealing parts being sealed in contact with each other; and two complement parts disposed outside of the first cup part and the second cup part and adjacent to the folding part, the complement parts being sealed together with the sealing part, wherein each of the complement parts has a polyhedral shape of a constant solid volume, wherein each of the complement parts consists of a same material as a sealant layer that is an innermost layer of the pouch film, and wherein each of the complement parts protrudes upward and downward relative to a plane of the sealing parts of the pouch film that surround the complement parts.

12. The pouch type secondary battery of claim 11, wherein each of the complement parts has a hexahedral shape.

13. The battery case of claim 1, wherein the polyhedral shape of each of the complement parts is a constant shape.

14. The pouch type secondary battery of claim 11, wherein the polyhedral shape of each of the complement parts is a constant shape.

* * * * *